(12) United States Patent
Nam et al.

(10) Patent No.: US 11,645,569 B2
(45) Date of Patent: *May 9, 2023

(54) STABILIZATION OF ENTANGLING GATES FOR TRAPPED-ION QUANTUM COMPUTERS

(71) Applicant: IONQ, INC., College Park, MD (US)

(72) Inventors: Yunseong Nam, North Bethesda, MD (US); Reinhold Blumel, Middletown, CT (US); Nikodem Grzesiak, Morges (CH)

(73) Assignee: IONQ, INC., College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,610

(22) Filed: Sep. 15, 2022

(65) Prior Publication Data

US 2023/0029117 A1 Jan. 26, 2023

Related U.S. Application Data

(63) Continuation of application No. 16/854,033, filed on Apr. 21, 2020, now Pat. No. 11,481,660.

(Continued)

(51) Int. Cl.
*G06N 10/00* (2022.01)
*G21K 1/00* (2006.01)
(Continued)

(52) U.S. Cl.
CPC .............. *G06N 10/00* (2019.01); *B82Y 10/00* (2013.01); *G21K 1/003* (2013.01);
(Continued)

(58) Field of Classification Search
CPC ........ G06N 10/00; B82Y 10/00; G21K 1/003; H01J 49/0072; H01S 3/09; H04B 10/70
(Continued)

(56) References Cited

U.S. PATENT DOCUMENTS 8,633,437 B2   1/2014   Dantus et al.
9,335,606 B2   5/2016   Hanson et al.
(Continued)

FOREIGN PATENT DOCUMENTS

JP   2021-508382 A   3/2021
JP   2021-527253 A   10/2021

OTHER PUBLICATIONS

A. W. Harrow, A. Hassidim, S. Llyod, Quantum algorithm for solving linear systems of equations. Phys. Rev. Lett. 15, 150502 (2009).

(Continued)

*Primary Examiner* — Nicole M Ippolito
(74) *Attorney, Agent, or Firm* — Patterson & Sheridan, LLP

(57) ABSTRACT

A method of performing a computation using a quantum computer includes generating a first laser pulse and a second laser pulse to cause entanglement interaction between a first trapped ion and a second trapped ion of a plurality of trapped ions that are aligned in a first direction, each of the plurality of trapped ions having two frequency- separated states defining a qubit, and applying the generated first laser pulse to the first trapped ion and the generated second laser pulse to the second trapped ion. Generating the first laser pulse and the second laser pulse includes stabilizing the entanglement interaction between the first and second trapped ions against fluctuations in frequencies of collective motional modes of the plurality of trapped ions in a second direction that is perpendicular to the first direction.

17 Claims, 7 Drawing Sheets

Related U.S. Application Data

(60) Provisional application No. 62/851,394, filed on May 22, 2019, provisional application No. 62/851,280, filed on May 22, 2019.

(51) Int. Cl.
    *H01S 3/09*     (2006.01)
    *H01J 49/00*     (2006.01)
    *B82Y 10/00*     (2011.01)
    *H04B 10/70*     (2013.01)

(52) U.S. Cl.
    CPC ............ *H01J 49/0072* (2013.01); *H01S 3/09* (2013.01); *H04B 10/70* (2013.01)

(58) Field of Classification Search
    USPC .......................................................... 250/251
    See application file for complete search history.

(56) References Cited

U.S. PATENT DOCUMENTS

| | | | |
|---|---|---|---|
| 9,858,531 | B1 | 1/2018 | Monroe et al. |
| 11,481,660 | B2 * | 10/2022 | Nam ...................... H04B 10/70 |
| 2006/0249670 | A1 | 11/2006 | Monroe et al. |
| 2009/0213444 | A1 | 8/2009 | Goto et al. |

OTHER PUBLICATIONS

M. Benedetti, D. Garcia-Pintos, O. Perdomo, V. Leyton-Ortega, Y. Nam, A. Perdomo-Ortiz, A generative modeling approach for benchmarking and training shallow quantum circuits. https://arxiv.org/abs/1801.07686 (2018).
P. W. Shor, Polynomial-time algorithms for prime factorization and discrete logarithms on a quantum computer. SIAM Rev. 41, 303-332 (1999).
M. Reiher, N. Wiebe, K. M. Svore, D.Wecker, M. Troyer, Elucidating reaction mechanisms on quantum computers. Proc. Natl. Acad. Sci. U.S.A. 114, 7555-7560 (2017).
Y. Nam and D. Maslov, Low cost quantum circuits for classically intractable instances of the Hamiltonian dynamics simulation problem. https://arxiv.org/abs/1805.04645 (2018).
S. Lloyd, M. Mohseni, P. Rebentrost, Quantum principal component analysis. Nat. Phys. 10, 631 (2014).
R. Orus, S. Mugel, E. Lizaso, Quantum computing for finance: overview and prospects. https://arxiv.org/abs/1807.03890 (2019).
K. Wright et al., Benchmarking an 11-qubit quantum computer, https://arxiv.org/abs/1903.08181 (2019).
S. Debnath, N. M. Linke, C. Figgatt, K. A. Landsman, K. Wright, C. Monroe, Demonstration of a small programmable quantum computer with atomic qubits. Nature 536, 63-66 (2016).
M. A. Nielsen, I. L. Chuang, Quantum Computation and Quantum Information (Cambridge Univ. Press, New York, NY, 2000).
K. M Imer, A. S rensen, Multiparticle entanglement of hot trapped ions. Phys. Rev. Lett. 82, 1835-1838 (1999).
S.-L. Zhu, C. Monroe, L.-M. Duan, Arbitrary-speed quantum gates within large ion crystals through minimum control of laser beams, Europhys. Lett. 73, 485 (2006).
T. Choi, S. Debnath, T. A. Manning, C. Figgatt, Z.-X. Gong, L.-M. Duan, and C. Monroe, Optimal Quantum Control of Multimode Couplings between Trapped Ion Qubits for Scalable Entanglement, Phys. Rev. Lett. 112, 190502 (2014).
J. P. Gaebler, T. R. Tan, Y. Lin, Y. Wan, R. Bowler, A. C. Keith, S. Glancy, K. Coakley, E. Knill, D. Leibfried, D. J. Wineland, High-delity universal gate set for 9Be+ion qubits. Phys. Rev. Lett. 117, 060505 (2016).
C. J. Ballance, T. P. Harty, N. M. Linke, M. A. Sepiol, D. M. Lucas, High-fidelity quantum logic gates using trapped-ion hyper ne qubits. Phys. Rev. Lett. 117, 060504 (2016).
T. P. Harty, D. T. C. Allcock, C. J. Ballance, L. Guidoni, H. A. Janacek, N. M. Linke, D. N. Stacey, D. M. Lucas, High-delity preparation, gates, memory, and readout of a trapped-ion quantum bit. Phys. Rev. Lett. 113, 220501 (2014).
P. H. Leung, K. A. Landsman, C. Figgatt, N. M. Linke, C. Monroe, K. R. Brown, Robust 2-qubit gates in a linear ion crystal using a frequency-modulated driving force, Phys. Rev. Lett. 120, 020501 (2018).
T. J. Green, M. J. Biercuk, Phase-modulated decoupling and error suppression in qubit-oscillator systems, Phys. Rev. Lett. 114, 120502 (2015).
Y. Nam et al., Ground-state energy estimation of the water molecule on a trapped ion quantum computer. https://arxiv.org/abs/1902.10171 (2019).
G. E. Crooks, Performance of the quantum approximate optimization algorithm on the maximum cut problem. https://arxiv.org/abs/1811.08419 (2018).
Y. Nam, Y. Su, D. Maslov, Approximate quantum Fourier transform with O(n log(n)) T gates. https://arxiv.org/abs/1803.04933 (2018).
T. G. Draper, S. A. Kutin, E. M. Rains, K. M. Svore, A logarithmic-depth quantum carry-lookahead adder. Quant. Inf. Comp. 6, 351-369 (2006).
R. Babbush et al., Encoding electronic spectra in quantum circuits with linear T complexity. Phys. Rev. X 8, 041015 (2018).
L. K. Grover, Quantum mechanics helps in searching for a needle in a haystack. Phys. Rev. Lett. 79, 325 (1997).
S. Bravyi, J. Haah, Magic state distillation with low overhead. Phys. Rev. A 86, 052329 (2012).
J. O'Gorman, E. T. Campbell, Quantum computation with realistic magic state factories. Phys. Rev. A 95, 032338 (2017).
F. A. Aloul, A. Ramani, I. L. Markov, K. A. Sakallah, Solving di cult SAT instances in the presence of symmetry. Proc. Des. Automat. Conf. 731-736 (2002).
C. Figgatt, A. Ostrander, N. M. Linke, K. A. Landsman, D. Zhu, D. Maslov, C. Monroe, Parallel entangling operations on a universal ion trap quantum computer. https://arxiv.org/abs/1810.11948 (2018).
Y. Lu, S. Zhang, K. Zhang, W. Chen, Y. Shen, J. Zhang, J.-N. Zhang, K. Kim, Scalable global entangling gates on arbitrary ion qubits. https://arxiv.org/abs/1901.03508 (2019).
N. Grzesiak, R. Blumel, K. Beck, K. Wright, V. Chaplin, J. Amini, N. Pisenti, S. Debnath, J.-S. Chen, Y. Nam, E cient Arbitrary Simultaneously Entangling Gates on a trapped-ion quantum computer. (To appear).
J. T. Merrill, K. R. Brown, Progress in compensating pulse sequences for quantum computation. https://arxiv.org/abs/1203.6392 (2012).
M. X. Goemans, D. P. Williamson, Improved approximation algorithms for maximum cut and satisfability problems using semide nite programming. J. ACM 42, 1115-1145 (1995).
A. M. Childs, D. Maslov, Y. Nam, N. J Ross, Y. Su, Toward the rst quantum simulation with quantum speedup. Proc. Natl. Acad. Sci. U.S A. 115, 9456-9461 (2018).
V. V. Shende, I. L. Markov, S. S. Bullock, Minimal universal two-qubit controlled-NOT-based circuits. Phys. Rev. A 69, 062321 (2004).
D. Maslov, On the advantages of using relative phase Toolis with an application to multiple control Toffoli optimization. Phys. Rev. A 93, 022311 (2016).
D. J. Wineland, C. Monroe, W. M. Itano, D. Leibfried, B. E. King, D. M. Meekhof, Experimental Issues in Coherent Quantum-State Manipulation of Trapped Atomic Ions, J. Res. Natl. Inst. Stand. Technol. 103, 259-328 (1998).
C. Marquet, F. Schmidt-Kaler, D. F. V. James, Phononphonon interactions due to non-linear effects in a linear ion trap. Appl. Phys. B 76, 199-208 (2003).
Y. Wu, S.-T. Wang, L.-M. Duan, Noise Analysis for High-Fidelity Quantum Entangling Gates in an Anharmonic Linear Paul Trap, Phys. Rev. A 97, 062325 (2018).
E. Hewitt, R. E. Hewitt, The Gibbs-Wilbraham phenomenon: An episode in Fourier analysis, Archive for History of Exact Sciences 21, 129-160 (1979).
G.-D. Lin et al., "Large-scale quantum computation in an anharmonic linear ion trap," Europhysics Letters, vol. 86, No. 6 (Jul. 9, 2009), 60004 (5 pages).

(56) References Cited

OTHER PUBLICATIONS

Yukai Wu et al., "Noise Analysis for High-Fidelity Quantum Entangling Gates in an Anharmonic Linear Paul Trap", Physical Review A, vol. 97(Jun. 19, 2018), 062325 (16 pages).
T. Choi et al., "Optimal Quantum Control of Multimode Couplings between Trapped Ion Qubits for Scalable Entanglement," Physical Review Letters, vol. 112 (May 16, 2014), 190502 (5 pages).
Pak Hong Leung et al. "Entangling an Arbitrary Prior of Qubits in a Long Ion Crystal", ARXIV.org, Cornell University Library, 201 Olin Library Cornell University Ithaca, NY 14853, Aug. 7, 2018, XP081096658, DOI: 10.1103/Physreva.8.032218.
International Search Report dated May 29, 2020 for Application PCT/US2020/015232.
Farhang Haddadfarshi et al. "High Fidelity Quantum Gates of Trapped Ions in the Presence of Motional Heating", New Journal of Physics, vol. 18, No. 12, Dec. 2, 2016, p. 123007, XP055722925.
International Search Report dated Sep. 4, 2020 for Application No. PCT/US2020/034008.
Search Report dated Aug. 27, 2020 for Application No. PCT/US2020/034010.
JP Office Action dated Jan. 5, 2023 for Application No. 2021-568278. (with machine translation).
JP Office Action dated Jan. 5, 2023 for Application No. 2021-568305. (with machine translation).

\* cited by examiner

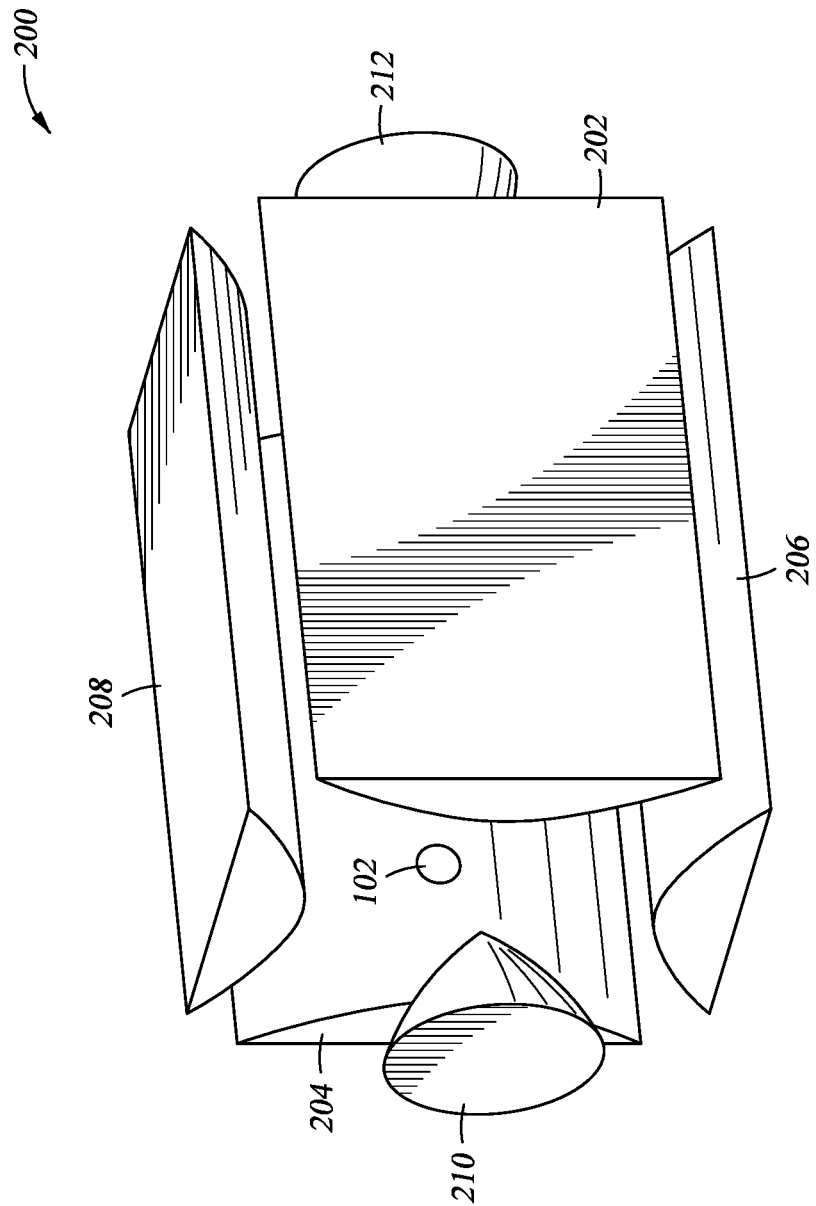

STABILIZATION OF ENTANGLING GATES FOR TRAPPED-ION QUANTUM COMPUTERS

CROSS-REFERENCE TO RELATED APPLICATIONS

This application is a continuation of co-pending U.S. patent application Ser. No. 16/854,033, filed Apr. 21, 2020, which claims the benefit to U.S. Provisional Application No. 62/851,280, filed May 22, 2019, and the benefit to U.S. Provisional Application No. 62/851,394, filed May 22, 2019. Each of the aforementioned related patent applications are incorporated by reference herein.

BACKGROUND

Field

The present disclosure generally relates to a method of generating an entangling gate in an ion trap quantum computer, and more specifically, to a method of stabilizing the entangling gate against fluctuations in frequencies of collective motional modes of trapped ions.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a chain of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a chain of trapped ions, which arise from their Coulombic interaction between the ions. As the size of a quantum computer increases, implementation of two-qubit gate operations between a pair of ions increases complexity, and thus errors associated with the implementation and resources required for the implementation, such as frequencies of the collective motional modes and laser powers, increase.

To increase the size of a quantum computer that may be able to implement algorithms to solve problems otherwise intractable in classical computer, there is a need for a procedure to accurately control qubits to perform in the presence of errors associated with the implementation and resources.

SUMMARY

Embodiments of the present disclosure generally relate to a method of performing a computation using a quantum computer includes generating a first laser pulse and a second laser pulse to cause entanglement interaction between a first trapped ion and a second trapped ion of a plurality of trapped ions that are aligned in a first direction, each of the plurality of trapped ions having two frequency-separated states defining a qubit, and applying the generated first laser pulse to the first trapped ion and the generated second laser pulse to the second trapped ion. Generating the first laser pulse and the second laser pulse includes stabilizing the entanglement interaction between the first and second trapped ions against fluctuations in frequencies of collective motional modes of the plurality of trapped ions in a second direction that is perpendicular to the first direction.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 depicts a schematic view of an ion trap for confining ions in a chain according to one embodiment.

Figure 1:
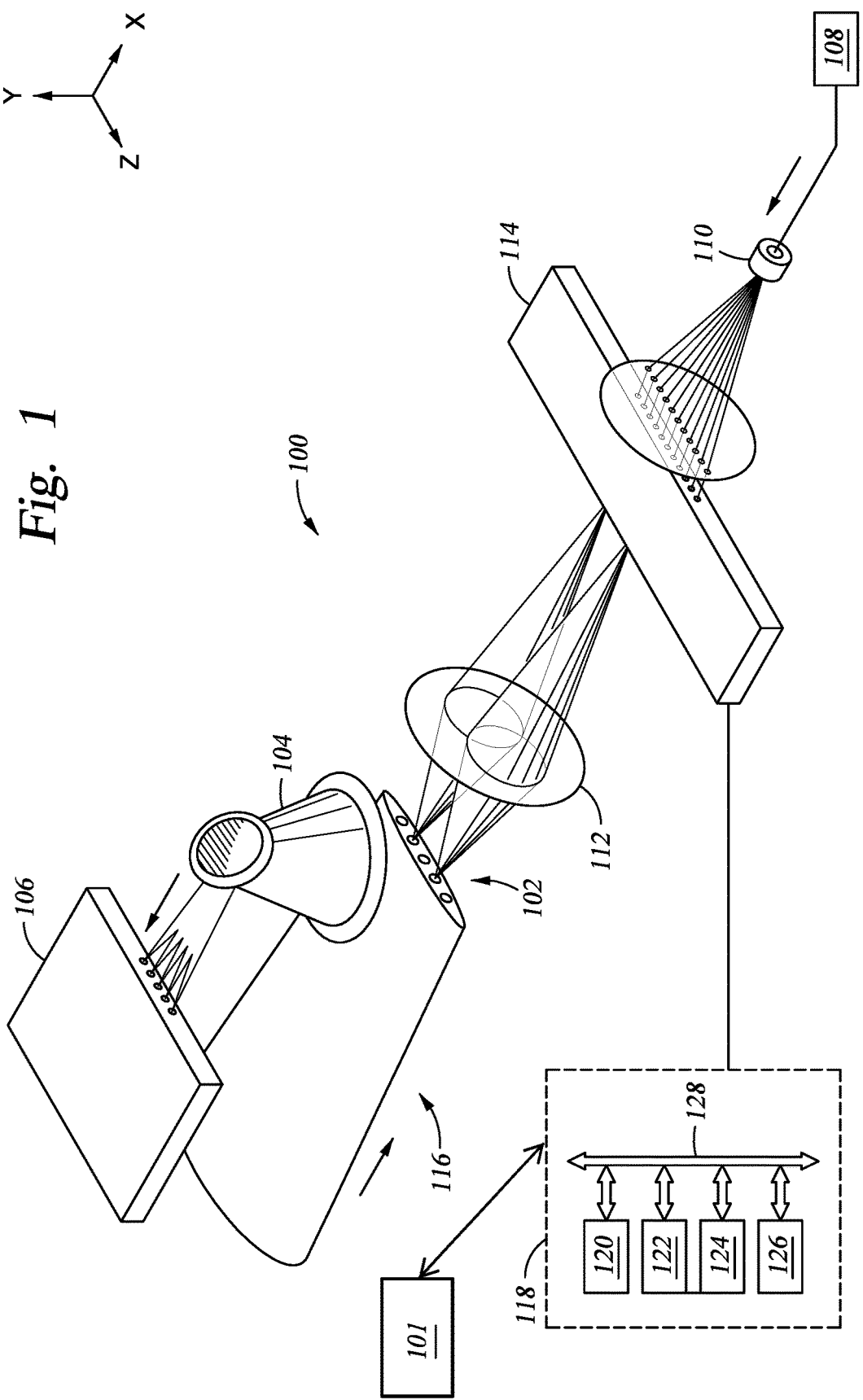
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal logic gates, translating the series of universal logic gates into laser pulses to apply on the quantum register, and pre-calculating parameters that optimize the laser pulses by use of a central processing unit (CPU). A software program for performing the task of decomposing and executing the quantum algorithms is stored in a non-volatile memory within the classical computer. The quantum register includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for power-optimal pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer.

Among several known sets of universal logic gates by which any quantum algorithm can be decomposed, a set of universal logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions. For those of ordinary skill in the art, it should be clear the R gate can be implemented with near perfect fidelity, while the formation of the XX gate is complex and requires optimization for a given type of trapped ions, number of ions in a chain of trapped ions, and the hardware and environment in which the trapped ions are trapped, to name just a few factors, such that the fidelity of the XX gate is increased and computational errors within a quantum computer are avoided or decreased.

In the following discussion, methods of generating and optimizing a pulse used to perform computations based the formation of an XX gate that has an improved fidelity in the presence of errors associated with the implementation and resources required for the implementation will be described.

General Hardware Configurations

FIG. 1 is a partial view of an ion trap quantum computer, or system 100, according to one embodiment. The system 100 includes a classical (digital) computer 101, a system controller 118 and a quantum register that is a chain 102 of trapped ions (i.e., five shown) that extend along the Z-axis. The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates all ions at once. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area. The control program will include one or more software applications that include program code (e.g., instructions) that may be executed by processor in order to perform various functionalities associated with receiving and analyzing data and controlling any and all aspects of the methods and hardware used to create the ion trap quantum computer system 100 discussed herein.

FIG. 2 depicts a schematic view of an ion trap 200 (also referred to as a Paul trap) for confining ions in the chain 102 according to one embodiment. The confining potential is exerted by both static (DC) voltage and radio frequency (RF) voltages. A static (DC) voltage $V_s$ is applied to end-cap electrodes 210 and 212 to confine the ions along the Z-axis (also referred to as an "axial direction," "longitudinal direction," or "first direction"). The ions in the chain 102 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction," "transverse direction," or "second direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Trapped Ion Configuration and Quantum Bit Information

Figure 3A:
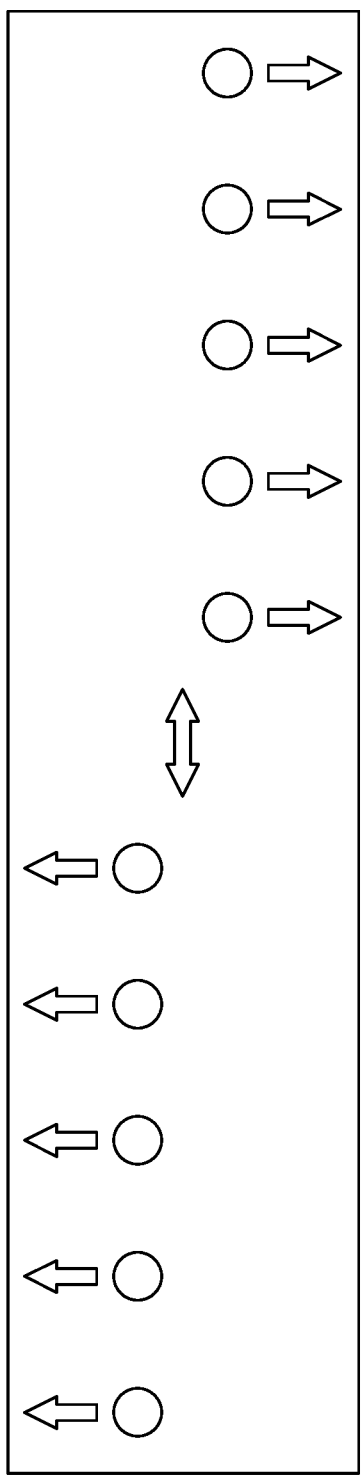
FIGS. 3A, 3B, and 3C depict a few schematic collective transverse motional mode structures of a chain of five trapped ions.
Figure 3B:
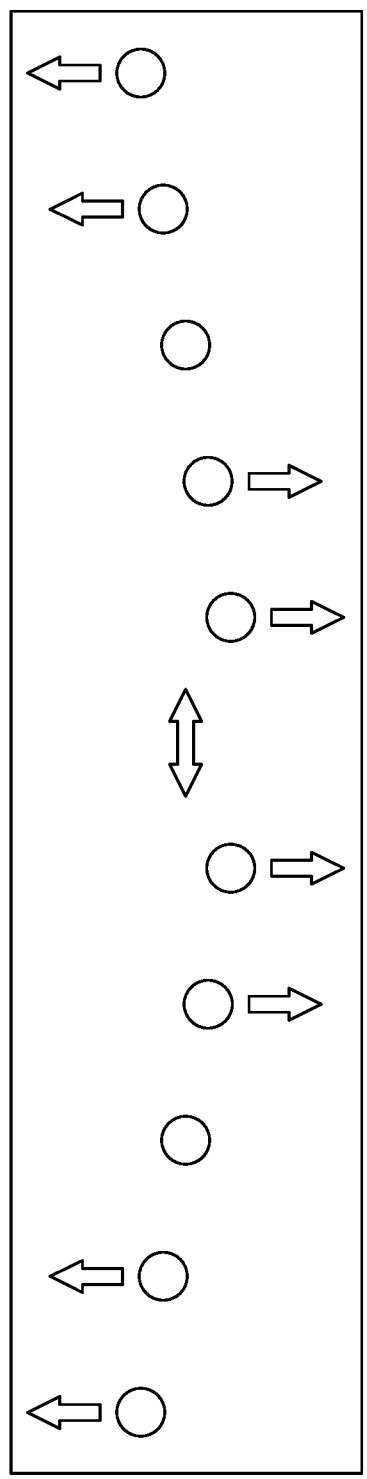
Figure 3C:
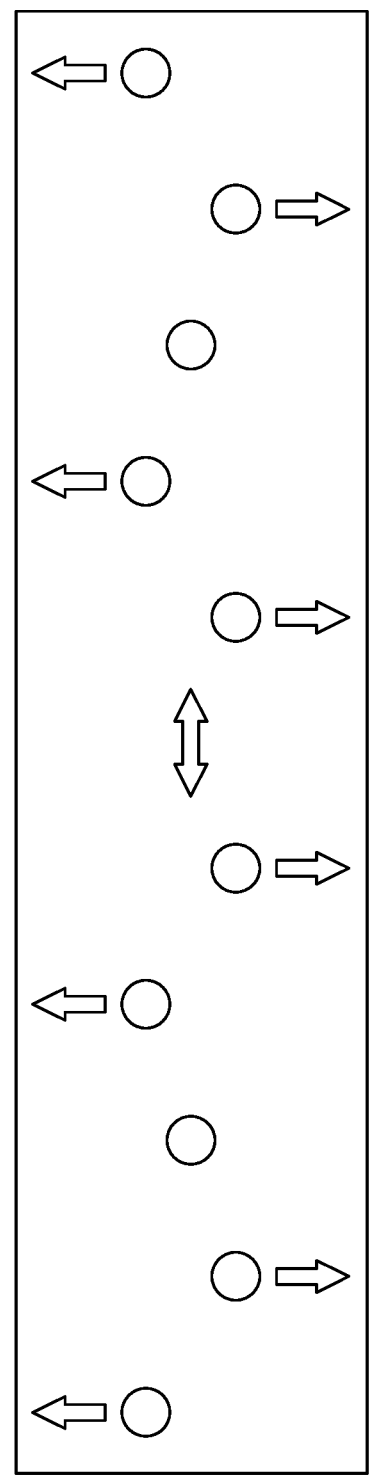

FIGS. 3A, 3B, and 3C depict a few schematic structures of collective transverse motional modes (also referred to simply as "motional mode structures") of a chain 102 of five trapped ions, for example. Here, the confining potential due to a static voltage $V_s$ applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest energy is hereinafter referred to as $|n_{ph}\rangle_p$, where $n_{ph}$ denotes the number of motional quanta (in units of energy excitation, referred to as phonons) in the motional mode, and the number of motional modes P in a given transverse direction is equal to the number of trapped ions N in the chain 102. FIGS. 3A-3C schematically illustrates examples of different types of collective transverse motional modes that may be experienced by five trapped ions that are positioned in a chain 102. FIG. 3A is a schematic view of a common motional mode $|n_{ph}\rangle_P$ having the highest energy, where P is the number of motional modes. In the common motional mode $|n\rangle_P$, all ions oscillate in phase in the transverse direction. FIG. 3B is a schematic view of a tilt motional mode $|n_{ph}\rangle_{P-1}$ which has the second highest energy. In the tilt motional mode, ions on opposite ends move out of phase in the transverse direction (i.e., in opposite directions). FIG. 3C is a schematic view of a higher-order motional mode $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
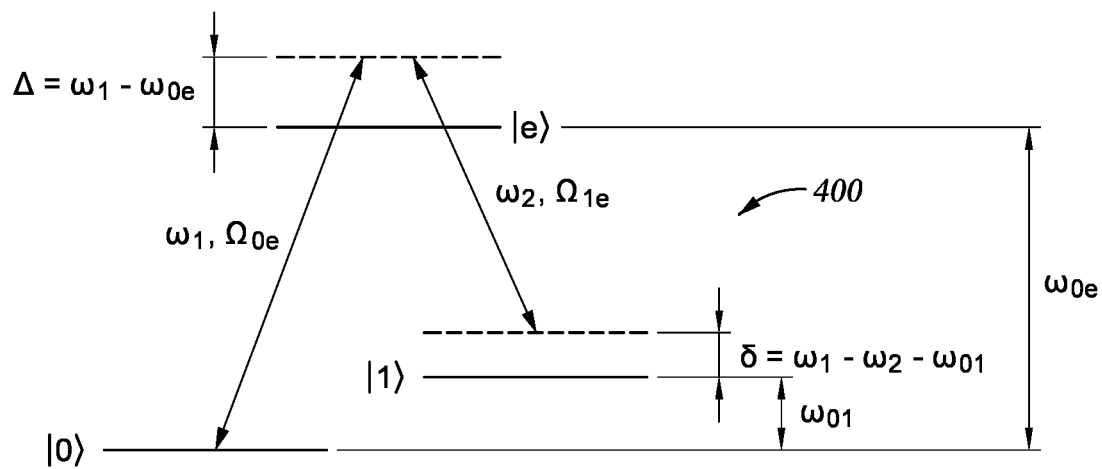
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. In one example, each ion may be a positive Ytterbium ion, $^{171}Yb^+$, which has the $^2S_{1/2}$ hyperfine states (i.e., two electronic states) with an energy split corresponding to a frequency difference (referred to as a "carrier frequency") of $\omega_{01}/2\pi=12.642821$ GHz. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg+$, and $Ba^+$) or transition metal ions ($Zn^+$, $Hg^+$, $Cd^+$).

Figure 5:
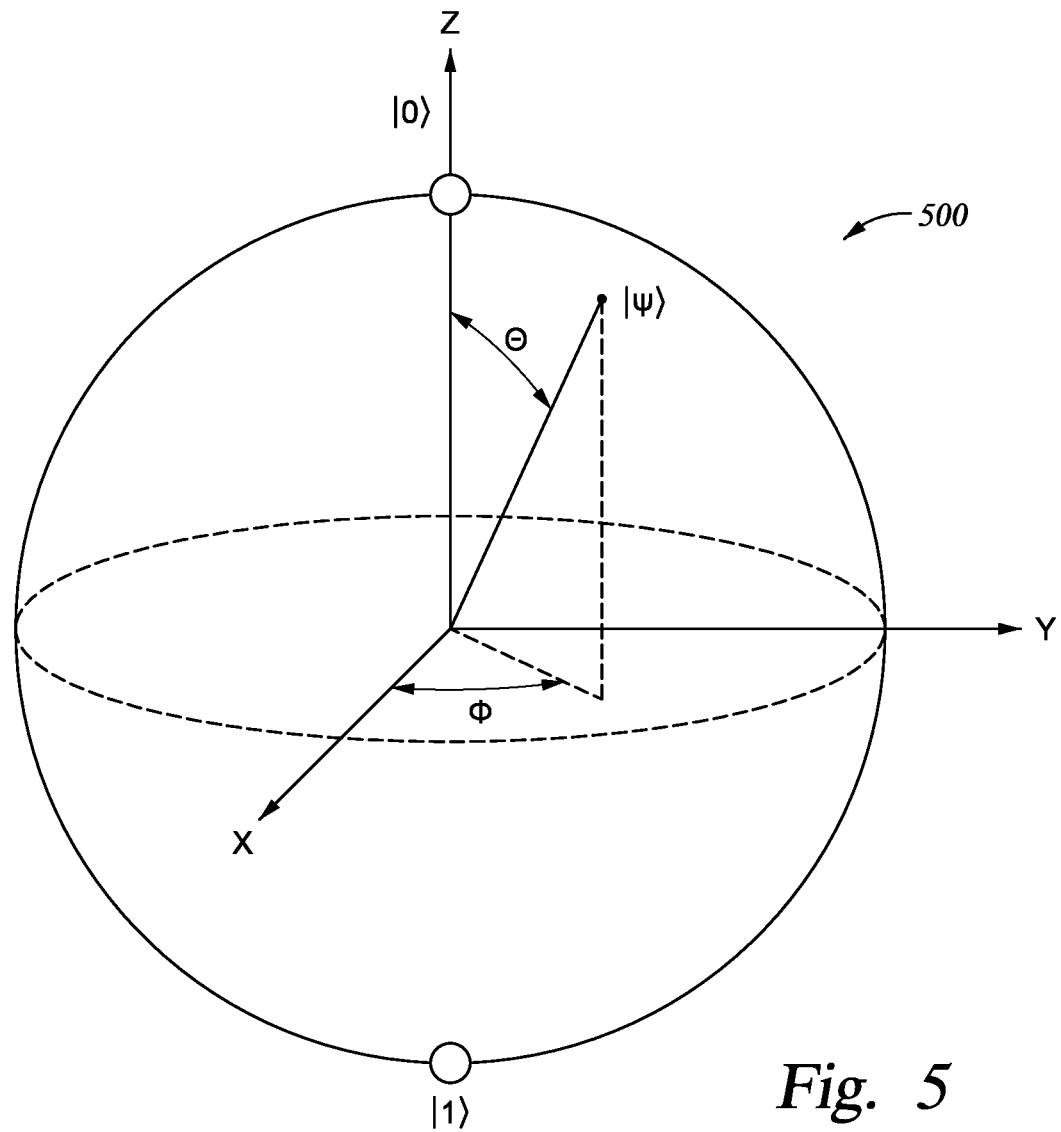
FIG. 5 depicts a qubit state of an ion represented as a point on a surface of the Bloch sphere.

FIG. 5 is provided to help visualize a qubit state of an ion is represented as a point on a surface of the Bloch sphere 500 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "$\pi$-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter without loss of generality) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "$\pi/2$-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Figure 6A:
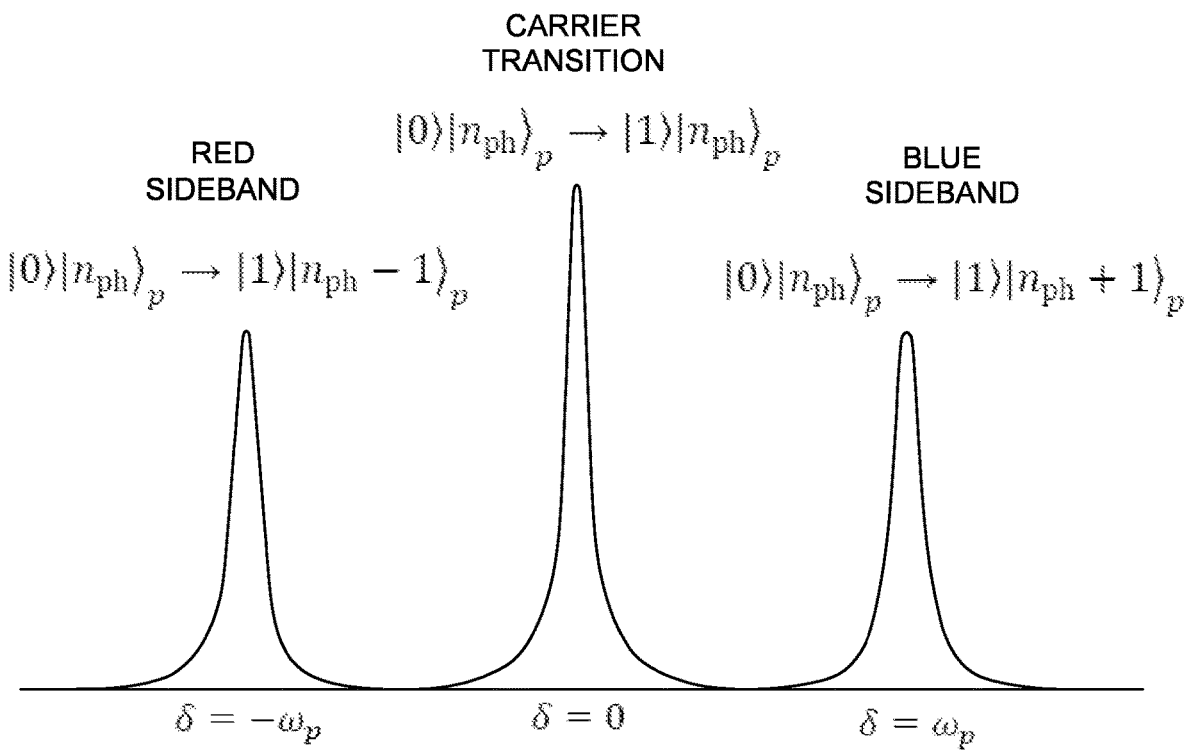
FIGS. 6A and 6B depict schematic views of motional sideband spectrum of each ion and a motional mode according to one embodiment.
Figure 6B:
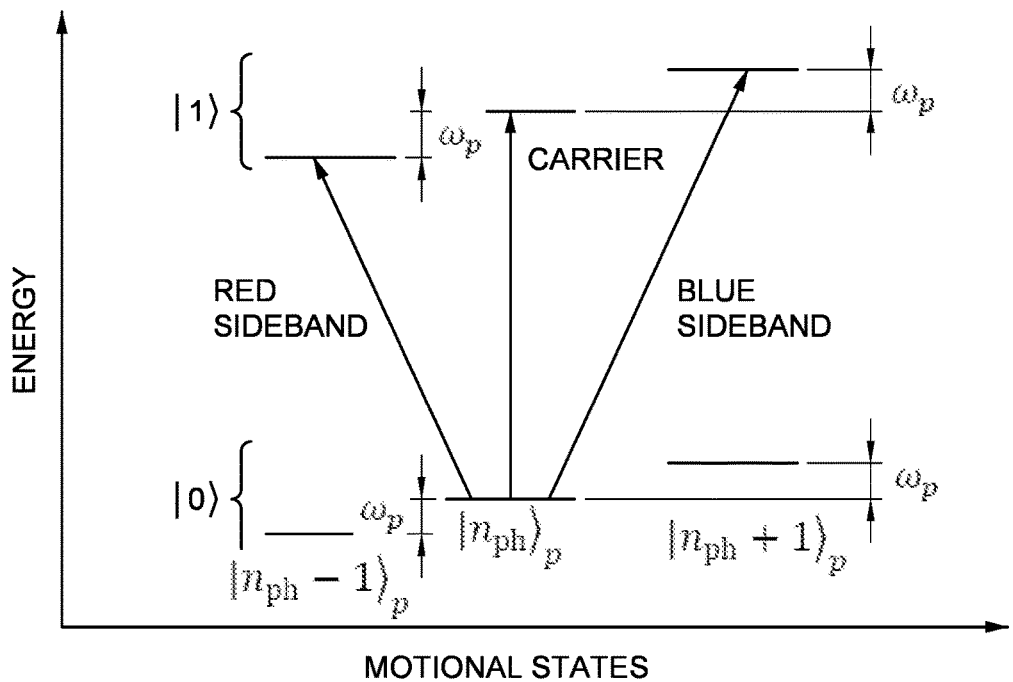

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the chain 102 in a motional mode $|n_{ph}\rangle_p$ having frequency $\omega_p$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_p$ and $|1\rangle|n_{ph}+1\rangle_p$ occurs (i.e., a transition from the p-th motional mode with n-phonon excitations denoted by $|n_{ph}\rangle_p$ to the p-th motional mode with $(n_{ph}+1)$-phonon excitations denoted by $|n_{ph}+1\rangle_p$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_p$ of the motional mode $|n_{ph}\rangle_p$, $\delta=\omega_1-\omega_2-\omega_{01}=-\mu<0$, referred to as a red sideband), Rabi flopping between combined qubit-motional states $|0\rangle|n_{ph}\rangle_p$ and $|1\rangle|n_{ph}-1\rangle_p$ occurs (i.e., a transition from the motional mode $|n_{ph}\rangle_p$ to the motional mode $|n_{ph}-1\rangle_p$ with one less phonon excitations occurs when the qubit state $|0\rangle$ flips to $|1\rangle$). A $\pi/2$-pulse on the blue sideband applied to a qubit transforms the combined qubit-motional state $|0\rangle|n_{ph}\rangle_p$ into a superposition of $|0\rangle|n_{ph}\rangle_p$ and $|1\rangle|n_{ph}+1\rangle_p$. A $\pi/2$-pulse on the red sideband applied to a qubit transforms the combined qubit-motional $|0\rangle|n_{ph}\rangle_p$ into a superposition of $|0\rangle|n_{ph}\rangle_p$ and $|1\rangle|n_{ph}-1\rangle_p$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, a qubit can be entangled with a desired motional mode by applying the right type of pulse, such as a $\pi/2$-pulse, which can be subsequently entangled with another qubit, leading to an entanglement between the two qubits. Entanglement between qubits is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, and $|1\rangle_i|1\rangle_j$ as follows:

$$|0\rangle_i|0\rangle_j \to |0\rangle_i|0\rangle_j - i|1\rangle_i|1\rangle_j$$

$$|0\rangle_i|1\rangle_j \to |0\rangle_i|1\rangle_j - i|1\rangle_i|0\rangle_j$$

$$|1\rangle_i|0\rangle_j \to -i|0\rangle_i|1\rangle_j + |1\rangle_i|0\rangle_j$$

$$|1\rangle_i|1\rangle_j \to -i|0\rangle_i|0\rangle_j + |1\rangle_i|1\rangle_j$$

For example, when the two qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_p$ is transformed into a superposition of $|0\rangle_i|n_{ph}\rangle_p$ and $|1\rangle_i|n_{ph}+1\rangle_p$, and thus the combined state of the two qubits and the motional mode is transformed into a superposition of $|0\rangle_i|0\rangle_j|n_{ph}\rangle_p$ and $|1\rangle_i|0\rangle_j|n_{ph}+1\rangle_p$. When a $\pi/2$-pulse on the red sideband is applied to the j-th qubit, the combined state of the j-th qubit and the motional mode $|0\rangle_j|n_{ph}\rangle_p$ is transformed to a superposition of $|0\rangle_j|n_{ph}\rangle_p$ and $|1\rangle_j|n_{ph}+1\rangle_p$, and the combined state $|0\rangle_j|n_{ph}+1\rangle_p$ is transformed into a superposition of $|0\rangle_j|n_{ph}+1\rangle_p$ and $|1\rangle_j|n_{ph}\rangle_p$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_i|0\rangle_j|n_{ph}\rangle_p$ into a superposition of $|0\rangle_i|0\rangle_j|n_{ph}\rangle_p$ and $|1\rangle_i|1\rangle_j|n_{ph}\rangle_p$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the XX-gate operation may be considered disentangled as the initial number of phonon excitations $n_{ph}$ in the p-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration $\tau$ (referred to as a "gate duration"), having amplitude $\Omega^{(i)}(t)$ and detuning frequency $\mu^{(i)}(t)$, and amplitude $\Omega^{(j)}(t)$ and detuning frequency $\mu^{(j)}(t)$, respectively, can be described in terms of an entanglement interaction $\chi_{ij}(\tau)$ as follows:

$$|0\rangle_i |0\rangle_j \rightarrow \cos(\chi_{ij}(\tau)/2)|0\rangle_i|0\rangle_j - i\sin(\chi_{ij}(\tau)/2)|1\rangle_i|1\rangle_j$$

$$|0\rangle_i |1\rangle_j \rightarrow \cos(\chi_{ij}(\tau)/2)|0\rangle_i|1\rangle_j - i\sin(\chi_{ij}(\tau)/2)|1\rangle_i|0\rangle_j$$

$$|1\rangle_i |0\rangle_j \rightarrow -i\sin(\chi_{ij}(\tau)/2)|0\rangle_i|1\rangle_j + \cos(\chi_{ij}(\tau)/2)|1\rangle_i|0\rangle_j$$

$$|1\rangle_i |1\rangle_j \rightarrow -i\sin(\chi_{ij}(\tau)/2)|0\rangle_i|0\rangle_j + \cos(\chi_{ij}(\tau)/2)|1\rangle_i|1\rangle_j$$

where, $$\chi_{ij}(\tau) = 4\sum_{p=1}^{P}\eta_{p}^{(i)}\eta_{p}^{(j)}\int_0^\tau dt_2 \int_0^{t_2} dt_1 \Omega^{(i)}(t_2)\Omega^{(j)}(t_1)\sin(\psi^{(i)}(t_2))\sin(\psi^{(j)}(t_1))\sin[\omega_p(t_2-t_1)]$$

and $\eta_p^{(l)}$ (l=i,j) is the Lamb-Dicke parameter that quantifies the coupling strength between the l-th ion and the p-th motional mode having the frequency $\omega_p$, $\psi^{(l)}(t)$ is an accumulated phase $\psi^{(l)}(t) = \psi_0^{(l)} + \int_0^t \mu^{(l)}(t')dt'$ of the pulse, $\psi_0^{(l)}$ is an initial phase which may be assumed to be zero (0) hereinafter for simplicity without loss of generality, and P is the number of the motional modes (equal to the number N of ions in the chain 102).

Construction of Pulses for Entangling Gate Operations

The entanglement interaction between two qubits described above can be used to perform an XX-gate operation. The XX-gate operation (XX gate) along with single-qubit operation (R gate) forms a set of universal gates {R, XX} that can be used to build a quantum computer that is configured to perform desired computational processes. To perform an XX-gate operation between m-th and n-th qubits, pulses that satisfy the condition $\chi_{ij}(\tau) = \theta_{ij}(0 < \theta_{ij} \leq \pi/2)$ (i.e., the entanglement interaction $\chi_{ij}(\tau)$ has a desired value $\theta_{ij}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta_{ij} = \pi/2$. The amplitudes and the detuning frequencies, $(\Omega^{(i)}(t), \mu^{(i)}(t))$ and $(\Omega^{(j)}(t), \mu^{(j)}(t))$, of the pulses to be applied to the i-th and the j-th qubits are control parameters that can be adjusted to ensure a non-zero tunable entanglement of the i-th and the j-th qubits to perform a desired XX gate operation on i-th and j-th qubits.

The control parameters, the amplitudes and detuning frequencies $(\Omega^{(l)}(t), \mu^{(l)}(t))$(l=i,j) of the pulses, must also satisfy conditions that all of the N trapped ions in the chain 102 that are displaced from their initial positions and the motional modes are excited by the delivery of the pulse return to the initial positions. The l-th qubit in a superposition state $|0\rangle \pm |1\rangle$ is displaced due to the excitation of the p-th motional mode during the gate duration $\tau$ and follows the trajectories $\pm\alpha_p^{(l)}(t')$ in phase space (position and momentum) of the p-th motional mode. The phase space trajectories $\alpha_p^{(l)}(t') = \eta_p^{(l)}\int_0^{t'}g^{(l)}(t)e^{i\omega_p t}dt$ are determined by the amplitude $\Omega^{(l)}(t)$ and the accumulated phase $\psi^{(l)}(t) = \psi_0^{(l)} + \int_0^t \mu^{(l)}(t')dt'$ of the pulse, where $g^{(l)}(t)$ is a pulse function defined as $g^{(l)}(t) = \Omega^{(l)}(t)\sin(\psi^{(l)}(t))$. Thus, for the chain 102 of N trapped ions, the condition $\pi_p^{(l)}(\tau) = 0$ (i.e., the phase space trajectories $\pi_p^{(l)}(\tau)$ of l-th qubit must be closed, referred to as a condition for returning of trapped ions to their original positions and momentum values (or closure of phase space trajectories) must be imposed for all the P motional modes (p=1, 2, ..., P) in addition to the condition for non-zero entanglement interaction, $\chi_{ij}(\tau) = \theta_{ij}(0 < \theta_{ij} \leq \pi/2)$.

The control parameters, the amplitudes and detuning frequencies $(\Omega^{(l)}(t), \mu^{(l)}(t))$ (l=i,j) of the pulses are also adjusted such that the resulting pulse is power-optimal, in which the required laser power is minimized (referred to as condition for minimized power). Since the required laser power is inversely proportional to the gate duration $\tau$, a power-optimal pulse implements an XX gate operation with minimum power requirement if gate duration $\tau$ is fixed, or with shortest gate duration $\tau$ if a laser power budget is fixed.

In some embodiments, the amplitudes and the detuning frequencies $(\Omega^{(l)}(t), \mu^{(l)}(t))$ (l=i,j) are chosen to be symmetric or anti-symmetric in time with respect to a middle point of the gate duration, $t = \tau/2$, i.e., $$\Omega^{(l)(\pm)}\left(\frac{\tau}{2} - t\right) = \pm\Omega^{(l)(\pm)}\left(\frac{\tau}{2} + t\right),$$

$$\mu^{(l)(\pm)}\left(\frac{\tau}{2} - t\right) = \pm\mu^{(l)(\pm)}\left(\frac{\tau}{2} + t\right).$$

In the example described below, the amplitudes and the detuning frequencies $(\Omega^{(l)}(t), \mu^{(l)}(t))$ are chosen to be symmetric $(\Omega^{(l)(+)}(t)$ and $\mu^{(l)(+)}(t))$ for simplicity and may be referred to as $\Omega^{(l)}(t)$ and $\mu^{(l)}(t)$ without the subscript (+). With the symmetric detuning frequency $\mu^{(l)}(t)$, the accumulated phase $\psi^{(l)}(t)$ is anti-symmetric, i.e., $$\sin\left(\psi^{(l)}\left(\frac{\tau}{2} - t\right)\right) = -\sin\left(\psi^{(l)}\left(\frac{\tau}{2} + t\right)\right).$$

The condition for returning of trapped ions to their original positions and momentum values can be rewritten in terms of the anti-symmetric component $g^{(l)(-)}(t)$ of the pulse function $g^{(l)}(t)$ (simply referred to as "pulse function" and denoted by $g^{(l)}(t)$ without the script (−) hereinafter), as $$\alpha_{l,p}(\tau) = \eta_p^{(l)}\int_0^\tau g^{(l)}(t)\sin\left[\omega_p\left(\frac{\tau}{2} - t\right)\right]dt = 0.$$

The pulse functions $g^{(l)}(t)$ that are determined by the amplitudes and the detuning frequencies $(\Omega^{(l)}(t), \mu^{(l)}(t))$ of the pulse (l=i,j) are derived such that these conditions are satisfied, by dividing the gate duration into $N_A$ equi-spaced segments (n=1, 2, ..., $N_A$), and varying the amplitudes and the detuning frequencies $(\Omega^{(l)}(t), \mu^{(l)}(t))$ of the pulse, thus varying the pulse functions $g^{(l)}(t)$, from one segment to another. Here, for example, the pulse function $g^{(l)}(t)$ is expanded in Fourier-sine basis, $$g^{(l)}(t) = \sum_{n=1}^{N_A} g_n^{(l)} \sin\left(2\pi n \frac{t}{\tau}\right)$$

over the gate duration $\tau$, using basis function $$\sin\left(2\pi n \frac{t}{\tau}\right)$$

and pulse function coefficients $g_n^{(l)}$. The condition for returning of trapped ions to their original positions and momentum values can be rewritten as $$\alpha_p^{(l)}(\tau) = 0 \mapsto \sum_{n=1}^{N_A} M_{pn} g_n^{(l)} = 0 (p = 1, 2, \ldots, P)$$

where $M_{pn}$ is defined as $$M_{pn} = \int_0^\tau \sin\left(2\pi n \frac{t}{\tau}\right) \sin\left(\omega_p\left(\frac{\tau}{2} - t\right)\right) dt (p = 1, 2, \ldots, P, \ n = 1, 2, \ldots, N_A).$$

Equivalently, the condition for returning of trapped ions to their original positions and momentum values (e.g., closure of phase space trajectories) can be written as $M\vec{g}^{(l)}=0$ in a matrix form, where M is a $P \times N_A$ coefficient matrix of $M_{pn}$ and $\vec{g}^{(l)}$ is a $N_A$ pulse function coefficient vector of $g_n^{(l)}$. The number of the segments $N_A$ is chosen to be larger than the number of motional modes P. Thus, there are $N_0(=N_A-P)$ non-trivial (i.e., at least one of the pulse function coefficients $A_n^{(l)}$ is non-zero) pulse function vectors $\vec{g}^{(l)[\alpha]}(\alpha=1, 2, \ldots, N_0)$ that satisfy the condition for returning of trapped ions to their original positions and momentum values. The non-trivial pulse function vectors $\vec{g}^{(l)[\alpha]}(\alpha=1, 2, \ldots, N_0)$ are null-space vectors of the matrix M (i.e., $M\vec{g}^{(l)[\alpha]}=0$).

The conditions for non-zero entanglement interaction and decoupling can be rewritten $$\chi_{ij}(\tau) = \theta_{ij} \mapsto \sum_{n=1}^{N_A} \sum_{n'=1}^{N_A} g_n^{(i)} D_{nn'}^{(i,j)} g_{n'}^{(j)} = \theta_{ij}$$

where $D_{nn'}^{(i,j)}$ is defined as $$D_{nn'}^{(i,j)} = 4 \sum_{p=1}^{P} \eta_p^{(i)} \eta_p^{(j)} \int_0^\tau dt_2 \int_0^{t_2} dt_1 \sin\left(2\pi n \frac{t_2}{\tau}\right) \sin\left(2\pi n' \frac{t_1}{\tau}\right) \sin[\omega_p(t_1 - t_2)],$$

or equivalently, $(\vec{g}^{(i)})^T D^{(i,j)} \vec{g}^{(j)} = \theta_{ij}$ in a matrix form, where $D^{(i,j)}$ is a $N_A \times N_A$ coefficient matrix of $D_{nn'}^{(i,j)}$ and $(\vec{g}^{(l)})^T$ is a transposed vector of $\vec{g}^{(l)}$. Since $(\vec{g}^{(i)})^T D^{(i,j)} \vec{g}^{(j)}$ is a scalar, the condition for non-zero entanglement interaction can be further rewritten in terms of a symmetric matrix $S^{(i,j)} = (D^{(i,j)} + D^{(i,j)^T})/2$, as $(\vec{g}^{(i)})^T S^{(i,j)} \vec{g}^{(j)} = \theta_{ij}$.

The condition for minimized power corresponds to minimizing a power function, $$P(t) = \|g^{(l)}(t)\|^2 = 2/\tau \int_0^\tau [g^{(l)}(t)]^2 dt = \sum_{n=1}^{N_A} [g_n^{(l)}]^2$$

that is the absolute square value of the pulse function $g^{(l)}(t)$ averaged over the gate duration $\tau$. Accordingly, a power-optimal pulse can be constructed by computing a linear combination ($\vec{g}^{(l)} = \sum_{\alpha=1}^{N_0} \Lambda_\alpha^{(l)} \vec{g}_\alpha^{(l)}$) of the non-trivial pulse function vectors $\vec{g}_\alpha^{(l)}$ (the null-space vectors of the matrix M) that satisfy the condition for returning of trapped ions to their original positions and momentum values, in which the coefficients $\Lambda_\alpha^{(l)}$ are determined such that the power function P(t) is minimized, while the condition for non-zero entanglement interaction is also satisfied. The condition for non-zero entanglement interaction leads to additional constrains on the coefficients $\Lambda_\alpha^{(l)}$, as $\vec{\Lambda}^{(i)T} R^{(i,j)} \vec{\Lambda}^{(j)} = \theta_{ij}$, where $\vec{\Lambda}^{(l)}(l=i,j)$ is a $N_0$ coefficient vector of $\Lambda_\alpha^{(l)}(\alpha=1, 2, \ldots, N_0)$, and $R^{(i,j)}$ is a real and symmetric matrix having matrix elements $R_{\alpha\beta}^{(i,j)} = \vec{g}_\alpha^{(i)T} S^{(i,j)} \vec{g}_\beta^{(j)}(\alpha, \beta=1, 2, \ldots, N_0)$. Thus, the amplitudes and the detuning frequencies ($\Omega^{(l)}(t), \mu^{(l)}(t)$) of the pulses (l=i,j) can be computed based on the pulse functions $g^{(l)}(t)$ having the pulse function coefficients $g_n^{(l)}$ (n=1, 2, ..., $N_A$) or equivalently the pulse function coefficient vector $\vec{g}^{(l)}$, that satisfy the condition for non-zero entanglement interaction and the condition for minimized power. It should be noted the condition for returning of trapped ions to their original positions and momentum values and the condition for non-zero entanglement interaction are in linear algebraic forms in terms of the pulse function coefficient vector $\vec{g}^{(l)}$. Thus, the pulse function coefficients $g_n^{(l)}$ that satisfy these conditions, along with the condition for minimized power, can be computed by known linear algebraic computational methods without approximation or iterations.

The expansion of the pulse function $g^{(l)}(t)$ in terms of pulse function coefficients $g_n^{(l)}$ corresponds to construction of a pulse in a frequency domain (with a frequency $2\pi n/\tau$), and thus a pulse constructed by the pulse function $g^{(l)}(t)$ may be directly implemented by multi-tone lasers (i.e., laser beams having multiple tones, each tone having a distinct amplitude and a corresponding frequency). That is, $N_A$-tone laser beams each having a frequency $2\pi n/\tau$ and amplitude $g_n^{(l)}$(n=1, 2, ..., $N_A$), with the phases of the laser beams fixed, may directly perform an XX gate operation. The pulse function may be expanded using any functions that form a complete set or an incomplete set over the gate duration. However, when the pulse function is expanded in an incomplete set, there is no guarantee that the pulse function $g^{(l)}(t)$ computed by the method described above is power-optimal.

It should be noted that the particular example embodiments described above are just some possible examples of a method of construction of pulse functions according to the present disclosure and do not limit the possible configuration, specifications, or the like of methods of construction of pulse functions. For example, the symmetry of the amplitudes and the detuning frequencies ($\Omega^l(t), \mu^{(l)}(t)$) (l=i,j) may be selected to be anti-symmetric (having a negative parity), or have mixed symmetry (having a mixed parity), based on convenience related to configurations, specifications, or the like of the system 100. However, imposing a symmetry in the amplitudes and the detuning frequencies ($\Omega^l(t), \mu^{(l)}(t)$) may lead to eliminating errors that have certain symmetries.

Stabilization Against Mode Frequency Fluctuations
and Calibration of Xx Gate

In the construction of a power-optimal pulse, additional conditions can be added without substantially increasing the complexity in computing the Fourier coefficient vector $\vec{g}^{(l)}$ (l=i,j) due to the linear algebraic forms of the conditions imposed on the coefficient vector $\vec{g}^{(l)}$(l=i,j). For example, a condition for stabilizing the pulse against external errors, such as fluctuations $\Delta\omega_p$ in the frequencies $\omega_p$ of the motional modes and the intensities of laser beams, can be additionally imposed while maintaining the linear algebraic forms of all the conditions. In the ion trap quantum computer, or system 100, there can be fluctuations $\Delta\omega_p$ in the frequencies $\omega_p$ of the motional modes due to stray electric fields, build-up charges in the ion trap 200 caused by photoionization or temperature fluctuations. Typically over a time span of minutes, the frequencies $\omega_p$ of the motional modes drift with excursion of $\Delta\omega_p/(2\pi)\approx 1$ kHz. The conditions for non-zero entanglement interaction, returning of trapped ions to their original positions and momentum values, and minimized power based on the frequencies $\omega_p$ of the motional modes are no longer satisfied when the frequencies $\omega_p$ of the motional modes have drifted to $\omega_p+\Delta\omega_p$, resulting in a reduction of the fidelity of the XX gate operation. It is known the infidelity 1−F of an XX gate operation between i-th and j-th qubits at zero temperature of the motional-mode phonons, is given by $$1-F = \frac{4}{5}\sum_p \left(|\alpha_{i,p}|^2 + |\alpha_{j,p}|^2\right).$$

This suggests the XX-gate operation can be stabilized against fluctuations $\Delta\omega_p$ in the frequencies $\omega_p$ of the motional modes by requiring that k-th order variations of the phase space trajectories $\alpha_{l,p}$ of the l-th qubit (l=i,j) with respect to the fluctuations $\Delta\omega_p$ in $\omega_p$, $$\frac{\partial^k \alpha_{l,p}(\tau)}{\partial \omega_p^k} = \int_0^\tau (it)^k g^{(l)}(t) e^{i\omega_p t} = 0$$

$$(l = i, j,\ p = 1, 2, \ldots, P,\ k = 1, 2, \ldots, K_\alpha)$$

be zero (referred to as k-th order stabilization), where $K_\alpha$ is a maximal desired degree of stabilization for $\alpha$. The pulse computed by requiring this condition for stabilization can perform an XX gate operation that is resilient against noise (i.e., fluctuations $\Delta\omega_p$ in the frequencies $\omega_p$ of the motional modes).

The fluctuations $\Delta\omega_p$ in the frequencies $\omega_p$ of the motional modes may also affect the value of the entanglement interaction $\chi_{ij}(\tau)$, since the entanglement interaction $\chi_{ij}(\tau)$ is related to the frequencies $\omega_p$ of the motional modes. That is, the resulting entanglement interaction $\chi_{ij}(\tau)$ may have a different value from the desired value $\theta_{ij}$ that is set in the condition for non-zero entanglement interaction, as discussed above. Thus, in some embodiments, the condition for stabilizing the entanglement interaction against fluctuations $\Delta\omega_p$ in the frequencies $\omega_p$ of the motional modes may also require that k-th order variations of the entanglement interaction $\chi_{ij}(\tau)$ with respect to the fluctuations $\Delta\omega_p$ in the frequencies $\omega_p$ of the motional modes, $$\chi_{ij,p}^{(k)} = \frac{\partial^k \chi_{ij}}{\partial \omega_p^k} = 0 (k=1, 2, \ldots K_\chi),$$

be zero (referred to as k-th order stabilization), where $K_\chi$ is a maximal desired degree of stabilization.

As noted above, the condition for non-zero entanglement interaction for a power-optimal pulse is written as $\vec{\Lambda}^{(i)T} R^{(i,j)} \vec{\Lambda}^{(j)} = \theta_{ij}$, where the coefficients $\Lambda_\alpha^{(l)}$ (the elements of the coefficient vector $\vec{\Lambda}^{(l)}$) in the null-space expansion ($\vec{g}^{(l)} = \Sigma_{\alpha=1}^{N_0} \Lambda_\alpha^{(l)} \vec{g}_\alpha^{(l)}$) of the pulse function $\vec{g}^{(l)}$ of the power-optimal pulse (l=i,j). Thus, the condition for the stabilization of the entanglement interaction against fluctuations in the frequencies $\omega_p$ of the motional modes up to k-th order with respect to fluctuations $\Delta\omega_p$ in $\omega_p$.(k-th order stabilization) is written in a matrix form, $$\chi_{ij,p}^{(k)} = \vec{\Lambda}^{(i)T} R_p^{(i,j)(k)} \vec{\Lambda}^{(j)} = 0 (k=1, 2, \ldots K_\chi)$$

where the matrix $R_p^{(i,j)(k)}$ has elements $R_{\alpha\beta,p}^{(i,j)(k)} = \vec{g}_\alpha^{(i)T} S_p^{(i,j)(k)} \vec{g}_\beta^{(j)}$ and the matrix $S_p^{(i,j)(k)}$ is defined as $$S_p^{(i,j)(k)} = \frac{\partial^k S^{(i,j)}}{\partial \omega_p^k}.$$

Single-Pulse Stabilization

In some embodiments, an identical pulse is applied to both the i-th qubit and the j-th qubit (i.e., the coefficient vectors $\vec{\Lambda}^{(i)}$ and $\vec{\Lambda}^{(j)}$ are the same) to perform an XX gate operation between the i-th qubit and the j-th qubit. Then, the matrix $R_p^{(i,j)(k)}$ and the coefficient vector $\vec{\Lambda}^{(i)}(=\vec{\Lambda}^{(j)})$ may be spectrally decomposed using the v-th eigenvalue $\lambda_{v,p}^{(i,j)(k)}$ of $R_p^{(i,j)(k)}$ and the corresponding eigenvector $|\lambda_{v,p}^{(i,j)(k)}\rangle$, as $R_p^{(i,j)(k)} = \Sigma_{v=1}^{N_0} \lambda_{v,p}^{(i,j)(k)} \rangle \langle \lambda_{v,p}^{(i,j)(k)} |$, and $\vec{\Lambda}^{(i)} = \vec{\Lambda}^{(j)} = \Sigma_{v=1}^{N_0} c_{v,p}^{(i,j)(k)} |\lambda_{v,p}^{(k)}\rangle$, respectively. In this spectral decomposition, the condition for the stabilization of a power-optimal pulse may be written as $\chi_{ij,p}^{(k)} = \Sigma_{v=1}^{N_0} |c_{v,p}^{(i,j)(k)}|^2 \lambda_{v,p}^{(i,j)(k)} = 0$. Thus, components in the null-space expansion $\vec{g}^{(l)} = \Sigma_{\alpha=1}^{N_0} \Lambda_\alpha^{(l)} \vec{g}_\alpha^{(l)}$ of a power-optimal pulse, which has a large eigenvalue $\lambda_{v,p}^{(i,j)(k)}$ un-stabilize against fluctuations in the frequencies $\omega_p$ of the motional modes.

To stabilize the entanglement interaction against fluctuations $\Delta\omega_p$ in the frequencies $\omega_p$ of the motional modes in the first order to a certain extent, the components in the power-optimal pulse $\vec{g}^{(l)} = \Sigma_{\alpha=1}^{N_0} \Lambda_\alpha^{(l)} \vec{g}_\alpha^{(l)}$ that have large eigenvalues $\lambda_{v,p}^{(i,j)(k)}$ are removed, and the resulting pulse is renormalized to obtain the entanglement condition $\chi_{ij}=\pi/2$.

Two-Pulse Stabilization

In some embodiments, a pulse applied to the i-th ion is chosen that is different from a pulse applied to the j-th ion such that the coefficient vectors $\vec{\Lambda}^{(i)}$ and $\vec{\Lambda}^{(j)}$ are orthogonal. Specifically, a pulse having the coefficient vector $\vec{\Lambda}^{(i)}$ to be applied to the i-th qubit to perform is chosen. Using the chosen coefficient vector $\vec{\Lambda}^{(i)}$, the coefficient vector $\vec{\Lambda}^{(j)}$ of a pulse to be applied to the j-th qubit is determined such that coefficient vector $\vec{\Lambda}^{(j)}$ satisfies the condition for the stabilization of the entanglement interaction $\chi_{ij,p}^{(k)} = \vec{\Lambda}^{(i)T} R_p^{(i,j)(k)}$ $\vec{\Lambda}^{(j)} = 0 (k=1, 2, \ldots K_\chi)$ as described above and the pulse is power-optimal. In some embodiments, the coefficient vectors $\vec{\Lambda}^{(i)}$ and $\vec{\Lambda}^{(j)}$ are chosen such that each of the coefficient vectors $\vec{\Lambda}^{(i)}$ and $\vec{\Lambda}^{(j)}$ satisfies the condition for the stabilization of the entanglement interaction in the single-pulse stabilization described above.

Fluctuations in intensities of the laser beams and Lamb-Dicke parameters $\eta_{i,p}$ may also affect the value of the entanglement interaction $\chi_{ij}(\tau)$, since the entanglement interaction $\chi_{ij}(\tau)$ is related to the amplitude $A_n$ (n=1, 2, ..., $N_A$) of each tone. That is, the resulting entanglement interaction $\chi_{ij}(\tau)$ may have a different value from the desired value $\theta_{ij}$ that is set in the condition for non-zero entanglement interaction. Thus, in some embodiments, known broadband laser pulse sequences, typically applicable for single-qubit gate operations, such as Solovay-Kitaev (SK) sequence and Suzuki-Trotter sequences, can be used to mitigate errors in the entanglement interaction $\chi_{ij}(\tau)$ with respect to, for instance, offsets in Lamb-Dicke parameters $\eta_{i,p}$. The same technique may be used to stabilize the entanglement interaction $\chi_{ij}(\tau)$ against any error sources that perturbs the entanglement interaction $\chi_{ij}(\tau)$ value.

Alternatively or additionally to the stabilization of the entanglement interaction $\chi_{ij}(\tau)$, the resulting entanglement interaction $\chi_{ij}(\tau)$ can be calibrated to the desired value $\theta_{ij}$ by modifying the amplitude $\Omega(t)$ of the pulse.

Demodulation of Pulses

To apply the power-optimal and error-resilient pulse on the l-th qubit (l=i,j), the amplitude and the detuning frequency ($\Omega^{(l)}(t)$, $\mu^{(l)}(t)$) of the power-optimal pulse need to be demodulated (i.e., the amplitude and the detuning frequency ($\Omega^{(l)}(t)$, $\mu^{(l)}(t)$) are extracted and the pulse function $g^{(l)}(t)$ is converted into a pulse having a series of time-dependent pulse segments of a single laser beam) from the determined pulse function $g^{(l)} = \Omega^{(l)}(t) \sin(\psi^{(l)}(t))$ (l=i,j) where $\psi^{(l)}(t) = \int_0^t \mu^{(l)}(t')dt'$ is the phase accumulated due to the detuning frequency $\mu^{(l)}(t)$. If this demodulation process is performed with a fixed detuning frequency, i.e., $\mu^{(l)}(t) = \mu_0$, the resulting pulse is amplitude-modulated (AM) pulse, in which the amplitude $\Omega^{(l)}(t)$ is modulated. If the demodulation process is performed with a fixed amplitude, i.e., $\Omega^{(l)}(t) = \Omega_0$, the resulting pulse is a phase-modulated (PM) pulse, in which the phase $\psi^{(l)}(t)$ is modulated. If the phase $\psi^{(l)}(t)$ is implemented by modulating detuning frequency $\mu^{(l)}(t)$, the resulting pulse is a frequency-modulated (FM) pulse. The demodulation process can be performed in any combined modulation of amplitude $\Omega^{(l)}(t)$, phase $\psi^{(l)}(t)$ (thereby the detuning frequency $\mu^{(l)}(t)$), and frequency to construct a power-optimal pulse by conventional demodulation methods known in the art of signal processing.

The first step of an exemplary demodulation process is to find zeros of the pulse function $g(t) = \Omega^{(l)}(t)\sin(\psi^{(l)}(t))$ at $t = \zeta_j$ (j=0,1, ..., $N_Z$–1) (i.e., $g(\zeta_j)=0$). Here, $N_Z$ is a total number of zeros of the pulse function $g^{(l)}(t)$. The amplitude $\Omega^{(l)}(t)$ can be chosen such that the amplitude $\Omega^{(l)}(t)$ does not have zeros. Thus, the pulse function $g^{(l)}(t)$ zero when $\sin(\psi^{(l)}(t))$ is zero (i.e., $\sin(\psi^{(l)}(\zeta_j))=0$). Due to the nature of the sine function, $\sin(\psi^{(l)}(\zeta_j))=0$ when $\psi^{(l)}(\zeta_j)=j\pi$ (j=0,1, ..., $N_Z$–1), including the zeros at the beginning and the end of the gate duration T of the pulse (i.e. $t=\zeta_0=0$ and $t=\zeta_{N_Z-1}=\tau$).

The second step of the demodulation process is to compute the detuning frequency $\mu^{(l)}(t)$ based on the zeros of the pulse function $g^{(l)}(t)$. In some embodiments, the detuning frequency $\mu^{(l)}(t)$ is approximated as a constant value between adjacent zeros of the pulse function $g^{(l)}(t)$ (i.e., $\mu^{(l)}(t) \approx \mu_j$ for $\zeta_{j-1} < t < \zeta_j$, j=1, 2, ..., $N_Z$–1). Since the phase $\psi^{(l)}(t)$ is accumulated due to the detuning frequency $\mu^{(l)}(t)$ as in $\psi^{(l)}(t) = \int_0^t \mu^{(l)}(t')dt'$, the difference between the phase at $t=\zeta_j$ and $t=\zeta_{j-1}$ is $\psi^{(l)}(\zeta_j) - \psi^{(l)}(\zeta_{j-1}) = \int_{\zeta_{j-1}}^{\zeta_j} \mu^{(l)}(t')dt' = \mu_j (\zeta_j - \zeta_{j-1}) = \pi$. Consequently, the detuning frequency $\mu_j$ between $t=\zeta_{j-1}$ and $t=\zeta_j$ is determined as $\mu_j = \pi/(\zeta_j - \zeta_{j-1})$. The third step of the demodulation process is compute the amplitude $\Omega^{(l)}(t)$. A time derivative of the pulse function $g^{(l)}(t) = \Omega^{(l)}(t)\sin(\psi^{(l)}(t))$ at $t=\zeta_j$ is $(g^{(l)})'(\zeta_j) = (\Omega^{(l)})'(\zeta_j)\sin(\psi^{(l)}(\zeta_j))\cos(\psi^{(l)}(\zeta_j))(\psi^{(l)})'(\zeta_j) = (-1)^j \Omega^{(l)}(\zeta_j)\mu^{(l)}(\zeta_j)$, where $\psi^{(l)}(\zeta_j) = j\pi$ and $\psi^{(l)}(t) = \int_0^t \mu^{(l)}(t')dt'$ are used. Thus, the amplitude $\Omega^{(l)}(t)$ at $t=\zeta_j$ is computed as $\Omega^{(l)}(\zeta_j) = (-1)^j (g^{(l)})'(\zeta_j)/\mu^{(l)}(\zeta_j)$ using the time derivative of the computed pulse function $g^{(l)}(t) = \sum_{n=1}^{N_A} g_k^{(l)} \sin(2\pi n t/\tau)$ (i.e., $$(g^{(l)})'(t) = \sum_{n=1}^{N_A} g_n^{(l)} \frac{2\pi n}{\tau} \cos(2\pi n t/\tau)\right).$$

In some embodiments, a set of the computed detuning frequencies $\mu_j$ (j=1, 2, ..., $N_Z$–1) is interpolated with splines (e.g., functions defined piecewise by one or more polynomials or other algebraic expressions) and the interpolated values of the detuning frequency $\mu^{(l)}(t)$ is used for $\mu^{(l)}(\zeta_j)$ for computing the amplitude $\Omega^{(l)}(\zeta_j)$. In some embodiments, $\mu^{(l)}(\zeta_j)$ is (i) $\mu_j$, (ii) $\mu_{j+1}$, or (iii) $(\mu_j + \mu_{j+1})/2$ is used as $\mu^{(l)}(\zeta_j)$ for computing the amplitude $\Omega^{(l)}(\zeta_j)$.

In some embodiments, a set of the computed amplitude $\Omega^{(l)}(\zeta_j)$ is also interpolated with splines to compute the time-dependent amplitude $\Omega^{(l)}(t)$.

If the demodulation process for a phase-modulated (PM) pulse, a set of the computed phase $\psi^{(l)}(\zeta_j)$ may be interpolated with splines to compute the time-dependent phase $\psi^{(l)}(t)$.

EXAMPLES

In the following, examples of stabilization against fluctuations $\Delta\omega$ in the frequencies $\omega_p$ of the motional modes according to the embodiments described above are shown.

Figure 7A:
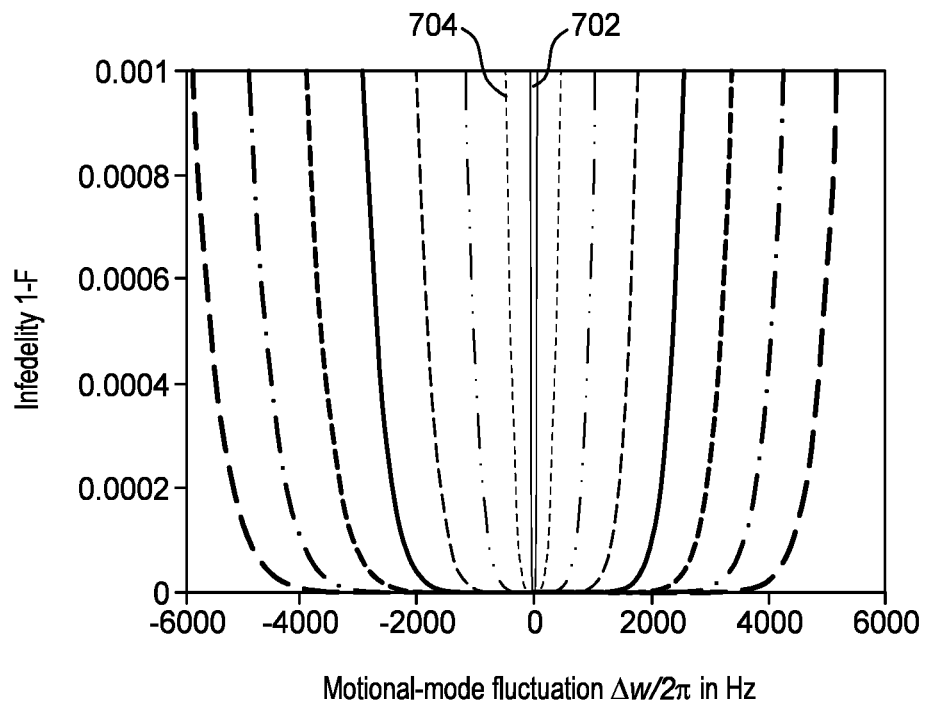
FIG. 7A depicts infidelity of an XX-gate operation for a chain of five trapped ions according to one embodiment.

In FIG. 7A, infidelity 1–F of an XX gate with k-th order stabilization (k=0, 1, ..., 8) is shown as a function of fluctuation $\Delta\omega$ in the frequencies $\omega_p$ of the motional modes, where the frequencies $\omega_p$ of the p-th motional mode (p=1, 2, ..., 5) are equally shifted to $\omega_p + \Delta\omega$. In this example, the gate duration $\tau$ is chosen as 300 µs over a chain 102 of five trapped ions.

The infidelity 1–F of the XX gate operation without the stabilization 702 increases substantially as a fluctuation $\Delta\omega$ in the frequencies $\omega_p$ of the motional modes increases, as the phase space trajectories $\alpha_p^{(l)}(\tau)$ are related to the frequencies $\omega_p$ of the p-th motional mode and thus sensitive to a fluctuation $\Delta\omega$ in the frequencies $\omega_p$. Thus, the pulse determined using inaccurate frequencies $\omega_p$ (i.e., the frequencies that are different from the actual frequencies) causes an XX gate operation to be inaccurate (i.e., different from the desired XX gate operation). The infidelity 1–F of an XX gate operation in which the first-order stabilization 704 is applied will stay low for small fluctuation $\Delta\omega$ of the frequencies $\omega_p$ (up to about 0.5 kHz). That is, the XX gate operation can be robust against fluctuations in the frequency of the motional mode with the first-order stabilization. The widths of the infidelity curves in FIG. 7A extracted at infidelity of 0.001

Figure 7B:
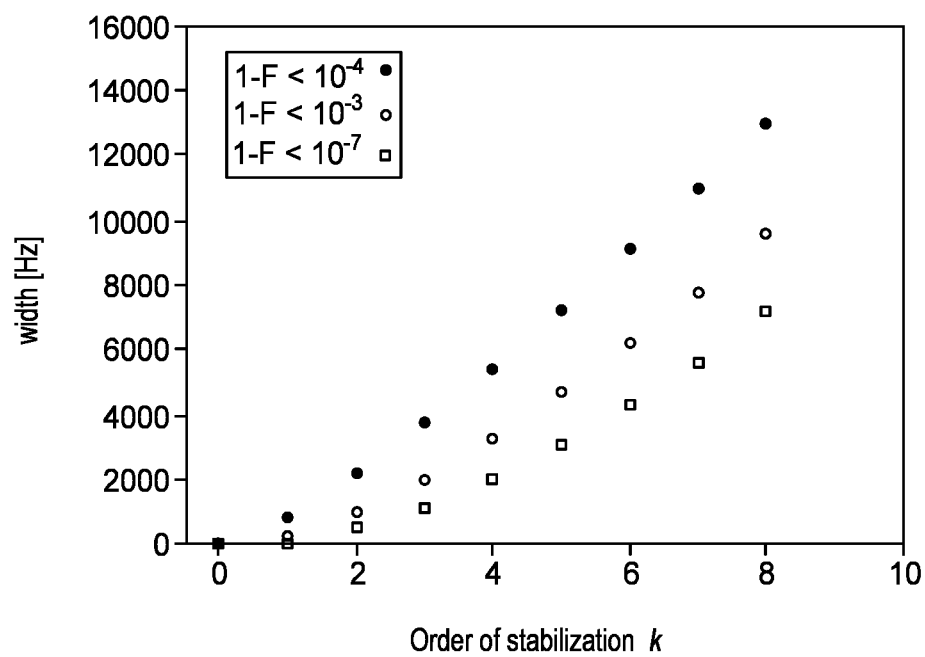
FIG. 7B depicts width of infidelity in FIG. 7A of an XX-gate operation.

(i.e., the range of fluctuations $\Delta\omega$ in which the infidelity $1-F$ can be made smaller than 0.001) increase from about 0.1 kHz to about 13 kHz as the order of stabilization k increases from 0 to 8 as shown in FIG. 7B.

Figure 7C:
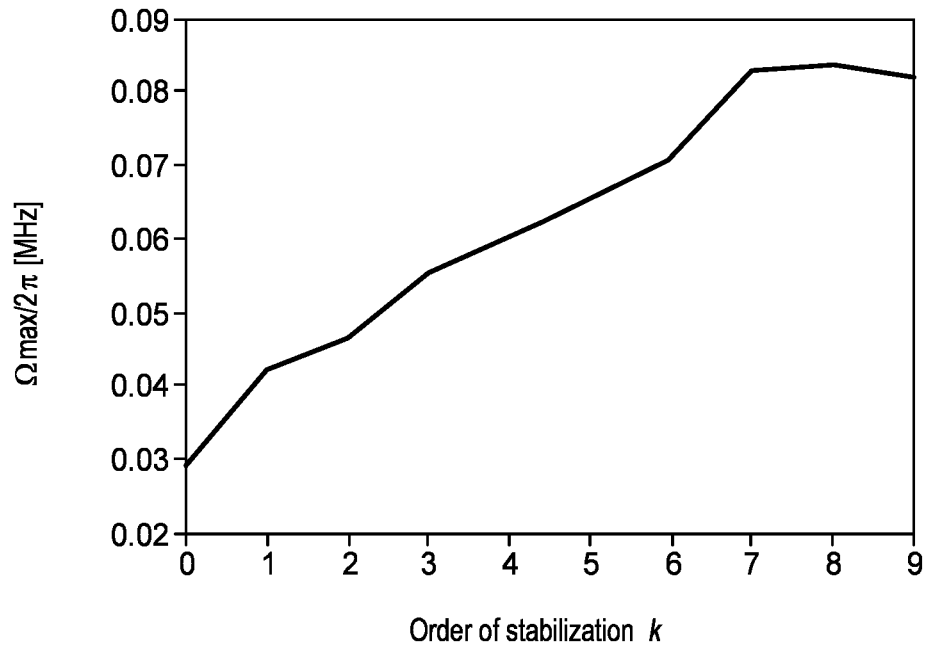
FIG. 7C depicts power requirement of stabilized pulses according to one embodiment.
Figure 7D:
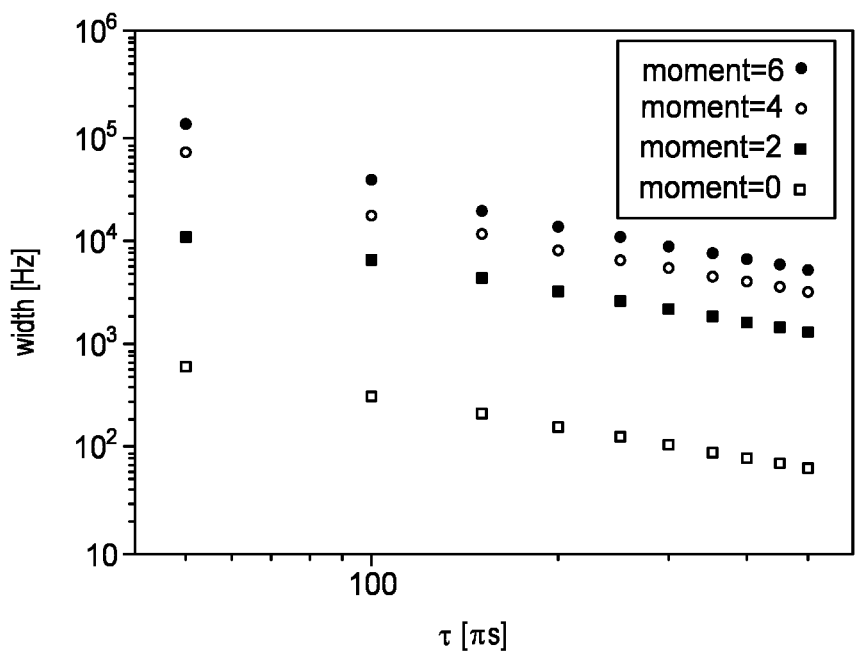
FIG. 7D depicts effect of stabilization according to one embodiment.

However, with the stabilization, the required laser power increases, for example, up to 40% in the example described herein. Hence, there is a trade-off between the degree of stabilization and the optimization of the required laser power. The power requirement of the stabilized pulses for each order of stabilization k the requirement scales linearly in the order of stabilization k as shown in FIG. 7C. The effect of the stabilization increases inversely proportional to the gate duration $\tau$ as shown in FIG. 7D.

As described above, methods of generating power-optimum laser pulses to perform an entangling gate operation between two qubits such that the entangling gate operation can be stabilized against external errors, leading to an improved fidelity of the entangling gate operation.

Additionally, determining control parameters in generating power optimum and error-resilient laser pulses to perform an entangling gate operation includes solving a set of linear equations. Thus, determining the control parameters and subsequently constructing a power-optimal and error-resilient laser pulse can be performed in an efficient manner. At the end of running the desired quantum algorithm, the population of the qubit states (trapped ions) within the quantum register is measured (read-out), so that the results of the quantum computation(s) with the desired quantum algorithm can be determined and provided to the classical computer for use to obtain solutions to the problems that may be intractable by the classical computer.

While the foregoing is directed to specific embodiments, other and further embodiments may be devised without departing from the basic scope thereof, and the scope thereof is determined by the claims that follow.

The invention claimed is:

1. A method of performing a computation using a quantum computer, comprising:
    computing a first set of values of a first amplitude and a first detuning frequency of a first laser pulse to be applied to a first ion of an ion chain, and a second set of values of a second amplitude and a second detuning frequency of a second laser pulse to be applied to a second ion of the ion chain, the ion chain comprising a plurality of ions that are aligned in a first direction, each of the plurality of ions having two frequency-separated states defining a qubit, based on a condition for returning of the first and second ions in the ion chain to their original positions and momentum values without requiring a condition for non-zero entanglement interaction between the first and second ions;
    selecting a third set of values of the first amplitude and the first detuning frequency among the first set of values, and a fourth set of values of the second amplitude and the second detuning frequency among the second set of values, based on the condition for non-zero entanglement interaction between the first and second ions;
    selecting values of the first amplitude and the first detuning frequency among the third set of values, and values of the second amplitude and the second detuning frequency among the fourth set of values, based on a condition that variations of the non-zero entanglement interaction between the first and second ions with respect to fluctuations in frequencies of collective motional modes of the ion chain in a second direction that is perpendicular to the first direction are zero; and
    applying the first laser pulse having the selected values of the first amplitude and the first detuning frequency to the first ion and the second laser pulse having the selected values of the second amplitude and the second detuning frequency to the second ion.

2. The method according to claim 1, wherein
the computing of the first set of values and the second set of values is further based on a condition that variations of phase space trajectories of the first and second ions with respect to fluctuations in the frequencies of the collective motional modes of the ion chain in the second direction are zero.

3. The method according to claim 2, wherein
the first amplitude is equal to the second amplitude, and the first detuning frequency is equal to the second detuning frequency.

4. The method according to claim 2, wherein
the first amplitude is different from the second amplitude, and
the first detuning frequency is different from the second detuning frequency.

5. The method according to claim 1, wherein
the first amplitude is equal to the second amplitude, and the first detuning frequency is equal to the second detuning frequency.

6. The method according to claim 1, wherein
the first amplitude is different from the second amplitude, and
the first detuning frequency is different from the second detuning frequency.

7. The method according to claim 1, wherein
the selecting of the values of the first amplitude and the first detuning frequency and the values of the second amplitude and the second detuning frequency is further based on power provided to the first and second ions by the first and second laser pulses.

8. The method according to claim 1, further comprising:
modifying the first amplitude of the first laser pulse and the second amplitude of the second laser pulse such that the non-zero entanglement interaction between the first and second ions is calibrated to a predetermined value.

9. The method according to claim 1, further applying a broadband laser pulse sequence to stabilize the non-zero entanglement interaction between the first and second ions when it is determined that a coupling strength of the first and second ions fluctuates with the collective motional modes.

10. A quantum computing system, comprising:
    an ion chain comprising a plurality of ions that are aligned in a first direction, each of the ions having two hyperfine states defining a qubit; and
    a controller comprising memory having a number of instructions stored therein which, when executed by a processor, causes the quantum computing system to perform operations comprising:
        computing a first set of values of a first amplitude and a first detuning frequency of a first laser pulse to be applied to a first ion of an ion chain, and a second set of values of a second amplitude and a second detuning frequency of a second laser pulse to be applied to a second ion of the ion chain, based on a condition for returning of the first and second ions in the ion chain to their original positions and momentum values without requiring a condition for non-zero entanglement interaction between the first and second ions;
        selecting a third set of values of the first amplitude and the first detuning frequency among the first set of values, and a fourth set of values of the second amplitude and the second detuning frequency among the second set of values, based on the condition for non-zero entanglement interaction between the first and second ions;

selecting values of the first amplitude and the first detuning frequency among the third set of values, and values of the second amplitude and the second detuning frequency among the fourth set of values, based on a condition that variations of the non-zero entanglement interaction between the first and second ions with respect to fluctuations in frequencies of collective motional modes of the ion chain in a second direction that is perpendicular to the first direction are zero; and applying the first laser pulse having the selected values of the first amplitude and the first detuning frequency to the first ion and the second laser pulse having the selected values of the second amplitude and the second detuning frequency to the second ion.

11. The quantum computing system according to claim 10, wherein each of the ions is $^{171}$Yb$^+$ having the $^2S_{1/2}$ hyperfine states.

12. The quantum computing system according to claim 10, wherein
the computing of the first set of values and the second set of values is further based on a condition that variations of phase space trajectories of the first and second ions with respect to fluctuations in the frequencies of the collective motional modes of the ion chain in the second direction are zero.

13. The quantum computing system according to claim 10, wherein
the first amplitude is equal to the second amplitude, and the first detuning frequency is equal to the second detuning frequency.

14. The quantum computing system according to claim 10, wherein
the first amplitude is different from the second amplitude, and
the first detuning frequency is different from the second detuning frequency.

15. The quantum computing system according to claim 10, wherein
the selecting of the values of the first amplitude and the first detuning frequency and the values of the second amplitude and the second detuning frequency is further based on power provided to the first and second ions by the first and second laser pulses.

16. The quantum computing system according to claim 10, wherein the operations further comprise:
modifying the first amplitude of the first laser pulse and the second amplitude of the second laser pulse such that the non-zero entanglement interaction between the first and second ions is calibrated to a predetermined value.

17. The quantum computing system according to claim 10, wherein the operations further comprise:
applying a broadband laser pulse sequence to stabilize the non-zero entanglement interaction between the first and second ions when it is determined that a coupling strength of the first and second ions fluctuates with the collective motional modes.

* * * * *